(12) United States Patent
Kwon et al.

(10) Patent No.: US 11,699,785 B2
(45) Date of Patent: Jul. 11, 2023

(54) COMPOSITE ELECTRODES AND METHODS OF MAKING THE SAME

(71) Applicant: Georgia Tech Research Corporation, Atlanta, GA (US)

(72) Inventors: Yo Han Kwon, Atlanta, GA (US); Elsa Reichmanis, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 426 days.

(21) Appl. No.: 16/978,443

(22) PCT Filed: Mar. 6, 2019

(86) PCT No.: PCT/US2019/020927
§ 371 (c)(1),
(2) Date: Sep. 4, 2020

(87) PCT Pub. No.: WO2019/173461
PCT Pub. Date: Sep. 12, 2019

(65) Prior Publication Data
US 2021/0075007 A1   Mar. 11, 2021

Related U.S. Application Data

(60) Provisional application No. 62/639,339, filed on Mar. 6, 2018.

(51) Int. Cl.
*H01M 4/38*        (2006.01)
*H01M 4/62*        (2006.01)
(Continued)

(52) U.S. Cl.
CPC ......... *H01M 4/386* (2013.01); *H01M 4/0416* (2013.01); *H01M 4/1399* (2013.01); *H01M 4/604* (2013.01); *H01M 4/622* (2013.01)

(58) Field of Classification Search
None
See application file for complete search history.

(56) References Cited

U.S. PATENT DOCUMENTS

2010/0038597 A1   2/2010  Reynolds et al.
2011/0223480 A1   9/2011  Wee et al.
(Continued)

FOREIGN PATENT DOCUMENTS

WO   2012129532   9/2012
WO   2014038836   3/2014

OTHER PUBLICATIONS

Search Report and Written Opinion from Application No. PCT/US2019/020927 dated Jun. 27, 2019 (16 pages).
(Continued)

*Primary Examiner* — Tracy M Dove
(74) *Attorney, Agent, or Firm* — Troutman Pepper Hamilton Sanders LLP; Ryan A. Schneider (57) ABSTRACT

Disclosed herein is a composite electrode comprising a charge-conducting material, a charge-providing material bound to the charge-conducting material, and a plurality of single-walled carbon nanotubes bound to a surface of the charge-providing material. High-capacity electroactive materials that assure high performance are a prerequisite for ubiquitous adoption of technologies that require high energy/power density lithium (Li)-ion batteries, such as smart Internet of Things (IoT) devices and electric vehicles (EVs). Improved electrode performance and lifetimes are desirable. The disclosed electrode can have a Coulombic efficiency of 99% or greater, and a stable capacity retention after 100 cycles or more. Also disclosed herein are methods of making a composite electrode.

17 Claims, 7 Drawing Sheets

(51) Int. Cl.
*H01M 4/1399* (2010.01)
*H01M 4/04* (2006.01)
*H01M 4/60* (2006.01)

(56) References Cited

U.S. PATENT DOCUMENTS

| | | |
|---|---|---|
| 2011/0229760 A1 | 9/2011 | Hidaka et al. |
| 2013/0161066 A1 | 6/2013 | Imae et al. |
| 2013/0334468 A1 | 12/2013 | Taniguchi et al. |
| 2014/0340818 A1 | 11/2014 | Xie et al. |
| 2019/0123339 A1* | 4/2019 | Yushin .............. H01M 10/0525 |
| 2019/0214640 A1* | 7/2019 | Salem .................. H01M 4/587 |

OTHER PUBLICATIONS

Kwon, et al., "Electron/Ion Transport Enhancer in High Capacity Li-Ion Battery Anodes," Chemistry of Materials Sep. 2016, vol. 28, No. 18, pp. 6689-6697.

\* cited by examiner

COMPOSITE ELECTRODES AND METHODS OF MAKING THE SAME

CROSS-REFERENCE TO RELATED APPLICATIONS

This application claims the benefit, under 35 U.S.C. § 119(e), of U.S. Provisional Patent Application No. 62/639,339, filed 6 Mar. 2018, the entire contents and substance of which is incorporated herein by reference in its entirety as if fully set forth below.

STATEMENT OF RIGHTS UNDER FEDERALLY SPONSORED RESEARCH

This invention was made with government support under Grant No. DE-SC0012673 awarded by the U.S. Department of Energy. The government has certain rights in the invention.

FIELD OF THE DISCLOSURE

The present disclosure relates generally to electrodes and methods of making the same. Particularly, embodiments of the present disclosure relate to composite electrodes.

BACKGROUND

High-capacity electroactive materials that assure high performance are a prerequisite for ubiquitous adoption of technologies that require high energy/power density lithium (Li)-ion batteries, such as smart Internet of Things (IoT) devices and electric vehicles (EVs). While high-capacity anode materials including silicon, tin, metal oxides and their derivatives have been identified; they undergo massive volume changes and resultant poor electrochemistry, which is arguably the major impediment delaying their practical implementation. Specifically, crack formation and pulverization during volume expansion contribute substantially to breakage of electronic pathways in electrodes and in turn, degradation of battery performance. Efforts have been made to suppress the electrical breakdown through introduction of electrically conducting functionalities (e.g. carbon coatings, carbon nanotubes (CNTs), or graphene) onto the active material surface. Despite improvements in performance, these approaches are not solely capable of maintaining electrical connectivity between cracked/pulverized active particles during repeated charge-discharge cycles because of weak van der Waals interactions between carbon and the active material surface. Thus, it is imperative to link the carbonaceous conducting agent (i.e., carbon nanotubes) and high-capacity active particles with a binding component. However, polymeric binders including modified carboxymethyl cellulose (CMC) and poly(acrylic acid) (PAA), utilized in enhanced high-capacity Li-ion battery electrodes, are intrinsically electrical insulators and would be expected to eventually increase electrode resistance.

What is needed, therefore, is a composite electrode which suppresses the electrochemical breakdown of the electrode and reduces stressful volume changes during use, while maintaining or improving performance and conductivity. Embodiments of the present disclosure address this need as well as other needs that will become apparent upon reading the description below in conjunction with the drawings.

BRIEF SUMMARY OF THE INVENTION

The present invention relates to porous molecular structures and methods for making the same. An exemplary embodiment of the present invention provides a composite electrode, comprising: a charge-conducting material; a charge-providing material bound to the charge-conducting material; and a plurality of single-walled carbon nanotubes bound to a surface of the charge-providing material.

In any of the embodiments disclosed herein, the charge-conducting material can comprise graphite.

In any of the embodiments disclosed herein, the charge-providing material can comprise silicon nanoparticles.

In any of the embodiments disclosed herein, the charge-providing material can comprise a metallic oxide.

In any of the embodiments disclosed herein, the metallic oxide can be magnetite.

In any of the embodiments disclosed herein, the electrode can further comprise a first polymer binding the plurality of single-walled carbon nanotubes to the charge-providing material.

In any of the embodiments disclosed herein, the electrode can further comprise a second polymer binding the charge-conducting material to the charge-providing material.

In any of the embodiments disclosed herein, the first polymer can comprise a polymer with carboxylic acid side chains.

In any of the embodiments disclosed herein, the first polymer can be bound to the single-walled carbon nanotube layer through pi bond-pi bond stacking.

In any of the embodiments disclosed herein, the first polymer can be poly[3-(potassium-4-butanoate) thiophene] (PPBT).

In any of the embodiments disclosed herein, the second polymer can be carboxymethyl cellulose (CMC).

In any of the embodiments disclosed herein, the electrode can present a Coulombic efficiency of 99% or greater.

In any of the embodiments disclosed herein, the electrode can present a Coulombic efficiency of from 99.5% to 99.95%.

In any of the embodiments disclosed herein, the electrode can present a Specific Capacity of 500 mAh/g or greater.

In any of the embodiments disclosed herein, the electrode can present a stable capacity retention of 75% or greater after 100 cycles.

In any of the embodiments disclosed herein, the electrode initial Specific Capacity can change by 5% or less after 200 cycles or more.

In any of the embodiments disclosed herein, the electrode can undergo a volume change of 40% or less after 100 cycles.

In any of the embodiments disclosed herein, the electrode can undergo a volume change of 25% or less after 100 cycles.

Another embodiment of the present disclosure provides a method of making a composite electrode, the method comprising: dispersing a plurality of single-walled carbon nanotubes and a first polymer in a first solvent to create a solution; providing a mixture powder, comprising a charge-providing material, a charge-conducting material, and a second polymer; combining the solution and the mixture powder to create a suspension; filtering the suspension to obtain an electroactive material; and coating the electroactive material on a substrate to form an electrode.

In any of the embodiments disclosed herein, the method can further comprise washing, with at least one nonsolvent, the electroactive material.

In any of the embodiments disclosed herein, the method can further comprise drying the electroactive material.

In any of the embodiments disclosed herein, the mixture powder can be in a solution with a second solvent.

In any of the embodiments disclosed herein, the method can further comprise separating, using a density separation, the mixture powder from the second solvent.

In any of the embodiments disclosed herein, the filtering can comprise vacuum filtering.

In any of the embodiments disclosed herein, the dispersing can comprise ultrasonication.

In any of the embodiments disclosed herein, the combining can comprise ultrasonication.

In any of the embodiments disclosed herein, the method can further comprise pressing the electrode to a predetermined density.

In any of the embodiments disclosed herein, the method can further comprise applying a binder material to the electrode.

In any of the embodiments disclosed herein, the second polymer can comprise polyethylene glycol (PEG).

In any of the embodiments disclosed herein, the first polymer can comprise a polymer with carboxylic acid side chains.

In any of the embodiments disclosed herein, the first polymer can be bound to the single-walled carbon nanotube layer through pi bond-pi bond stacking.

In any of the embodiments disclosed herein, the first polymer can be poly[3-(potassium-4-butanoate) thiophene] (PPBT).

In any of the embodiments disclosed herein, the second polymer can be carboxymethyl cellulose (CMC).

In any of the embodiments disclosed herein, the electrode can present a Coulombic efficiency of 99% or greater.

In any of the embodiments disclosed herein, the electrode can present a Coulombic efficiency of from 99.5% to 99.95%.

In any of the embodiments disclosed herein, the electrode can present a Specific Capacity of 500 mAh/g or greater.

In any of the embodiments disclosed herein, the electrode can present a stable capacity retention of 75% or greater after 100 cycles.

In any of the embodiments disclosed herein, the electrode initial Specific Capacity can change by 5% or less after 200 cycles or more.

In any of the embodiments disclosed herein, the electrode can undergo a volume change of 40% or less after 100 cycles.

In any of the embodiments disclosed herein, the electrode can undergo a volume change of 25% or less after 100 cycles.

These and other aspects of the present invention are described in the Detailed Description of the Invention below and the accompanying figures. Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. Further, while one or more embodiments may be discussed as having certain advantageous features, one or more of such features may also be used with the various embodiments of the invention discussed herein. In similar fashion, while exemplary embodiments may be discussed below as device, system, or method embodiments, it is to be understood that such exemplary embodiments can be implemented in various devices, systems, and methods of the present invention.

BRIEF DESCRIPTION OF THE DRAWINGS

The accompanying drawings, which are incorporated in and constitute a part of this specification, illustrate multiple embodiments of the presently disclosed subject matter and serve to explain the principles of the presently disclosed subject matter. The drawings are not intended to limit the scope of the presently disclosed subject matter in any manner.

DETAILED DESCRIPTION

Although certain embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. Other embodiments of the disclosure are capable of being practiced or carried out in various ways. Also, in describing the embodiments, specific terminology will be resorted to for the sake of clarity. It is intended that each term contemplates its broadest meaning as understood by those skilled in the art and includes all technical equivalents which operate in a similar manner to accomplish a similar purpose.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

As described above, a problem with current high-capacity electrodes is the electrical breakdown, such as cracking and pulverization, and large volume changes reducing the electrochemical efficiency of the material. Efforts have been made to suppress the electrical breakdown through introduction of electrically conducting functionalities onto the active material surface. Despite improvements in performance, these approaches are not solely capable of maintaining electrical connectivity between cracked/pulverized active particles during repeated charge-discharge cycles because of weak van der Waals interactions between carbon and the active material surface. Thus, it is imperative to link the carbonaceous conducting agent (carbon nanotubes) and high-capacity active particles with a binding component. However, polymeric binders including modified sodium carboxymethyl cellulose (CMC) and poly(acrylic acid) (PAA), utilized in enhanced high-capacity Li-ion battery electrodes, are intrinsically electrical insulators and would be expected to eventually increase electrode resistance. Furthermore, since they have poor affinity with the conducting agent surface, it would additionally be necessary to effectively disperse and debundle the carbon nanotubes.

When studying materials to solve these problems, attention is turned to special polymeric binders. Water-soluble, carboxylate substituted polythiophenes, such as poly[3-(potassium-4-butanoate) thiophene] (PPBT), have the potential to serve as a polymeric binder, or a physical/chemical linker to render electroactive particles and carbon additives well-connected through specific molecular interactions, thereby yielding stable, high-performance battery electrodes. The PPBT has relatively high electronic conductivity of $10^{-5}$ S cm$^{-1}$ when compared with polyvinylidene fluoride (PVDF; $10^{-8}$ S cm$^{-1}$); and experiences electrochemical doping where the conjugated polymer undergoes reduction within the operating voltage of anode applications, enabling more rapid electron transport. In addition, PPBT, with its conjugated backbone and side chain carboxylic moieties, has been shown to contribute to single-walled carbon nanotube (SWNT) dispersion and the formation of carboxylate bonds through interactions with surface electroactive particle hydroxyl groups. In particular, the pi conjugated polythiophene backbone physically interacts with the graphene-like electron rich nanotube surface, while the solubilizing carboxylate substituted side chains support SWNT debundling and dispersion in water.

Disclosed herein is a composite electrode. In order to suppress electrical breakdown, carbon nanotubes are utilized to contain the active material and prevent large cracking, volume changes, or pulverization. In order to maintain conductive performance, binding material is needed to bind the carbon nanotubes to the active material. According to some embodiments, the used of a carboxylated polythiophene linker to securely bind SWNT electrical networks onto the surface of an active material as found to ensure the electrical and structural stability of the electrode. Beneficially, this architecture effectively captured cracked/pulverized particles that typically form as a result of repeated active material volume changes that occur during charging and discharging. Thus, changes in electrode thickness were suppressed substantially, stable SEI layers were formed, electrode resistance was reduced, and enhanced electrode kinetics was observed. Together, these factors led to excellent electrochemical performance.

Disclosed herein are composite electrodes. Embodiments of the present disclosure can provide a composite electrode comprising a charge-conducting material, a charge-providing material bound to the charge-conducting material, and a plurality of SWNTs bound to a surface of the charge-providing material. In some embodiments, the charge-conducting material can be any electrically active material. In other words, the charge-conducting material can be a material with a low resistance able to provide electron flow through the material. Suitable examples or a charge-conducting material can include, but are not limited to, graphite, silver, copper, gold, aluminum, calcium, tungsten, zinc, nickel, lithium, iron, platinum, tin, gallium, niobium, steel, carbon steel, lead, titanium, electrical steel, manganin, constantan, stainless steel, mercury, manganese, amorphous carbon, germanium, salt water, a combination thereof, and the like. In some embodiments, the charge-conducting material can be any material providing a conductivity of 100 S/m or greater (e.g., 200 S/m or greater, 300 S/m or greater, 400 S/m or greater, 500 S/m or greater, 1000 S/m or greater, 5000 S/m or greater, or 10000 S/m or greater). In some embodiments, the charge-conducting material can be any material providing a conductivity of 1 Ω-m or less (e.g., 0.1 Ω-m or less, 0.01 Ω-m or less, 0.001 Ω-m or less, or 0.0001 Ω-m or less).

In some embodiments, the disclosed composite electrode can comprise a charge-providing material. In some embodiments, the charge-providing material can be any material configured to provide a flow of electrons while undergoing a redox reaction while in use. Suitable examples of charge-providing materials can include, but are not limited to, metal oxides, metallic oxides, iron alloys, magnetite, lithium, lithium ions, silicon nanoparticles, metal dioxides, oxygen, metal hydroxides, monofluorides, phosphates, and the like. In other words, a charge-providing material is an active material that facilitates the electrochemical reaction by acting as an electron source or an electron sink. As used herein, the term "active material" refers to a material that facilitates the electrochemical reaction by acting as an electron source or an electron sink.

In some embodiments, the disclosed composite electrode can comprise a plurality of single-walled carbon nanotubes (SWNTs) bound to a surface of the charge-providing material. In some embodiments, the SWNTs can be in any configuration, such as armchair, chiral, zigzag, or a combination thereof.

In some embodiments, the disclosed composite electrode can comprise one or more polymers. In some embodiments, the electrode can comprise a first polymer binding the SWNTs to the charge-providing material. In some embodiments, the electrode can comprise a second polymer binding the charge-conducting material to the charge-providing material. In any of the embodiments disclosed herein, the first and second polymer can be any polymer. Suitable examples of a polymer can include, but are not limited to, biopolymers, inorganic polymers, organic polymers, conductive polymers, copolymers, fluoropolymers, polyterpenes, phenolic resins, polyanhydrides, polyketones, polyesters, polyimides (such as Matrimid 5218 or 6FDA-DAM), polyolefins, rubbers, silicones, silicone rubbers, superabsorbent polymers, synthetic rubbers, vinyl polymers, or a combination thereof. Other suitable examples of the polymer can include, but are not limited to, polyester resin, polyurethanes, polyurea, vulcanized rubber, bakelite, duroplast, urea formaldehyde, melamine resin, diallyl phthalate, epoxy resin, benzoxazines, polyimides, bismaleimides, cyanate esters, furan resins, silicone resins, thiolyte, vinyl ester, acrylic, polymethyl methacrylate, acrylonitrile butadiene styrene, chlorinated polyvinyl chloride, nylon, polylactic acid, polybenzimidazole, polycarbonate, polyether sulfone, polyoxymethylene, polyether ether ketone, polyethylene, polyphenylene sulfide, polypropylene, polystyrene, polyvinyl chloride, polyvinylidene fluoride, polytetrafluoroethylene, polyisoprene, polybutadiene, chloroprene, butyl rubber, halogenated butyl rubber, styrene butadiene, nitrile rubber, halogenated nitrile rubber, ethylene propylene rubber, ethylene propylene diene rubber, epichlorohydrin rubber, polyacrylic rubber, silicone rubber, fluorosilicone, fluoroelastomers, perfluoroelastomers, polyether block amides, chlorosulfonated polyethylene, ethylene vinyl acetate, thermoplastic elastomers, polysulfide rubber, cellulose acetate (CA), polymer of intrinsic micro porosity 1 (PIM-1), poly [3-(potassium-4-butanoate) thiophene] (PPBT), carboxymethyl cellulose (CMC), polyethylene glycol (PEG), or a combination thereof. Additional examples of suitable polymers useable include substituted or unsubstituted polymers and may be selected from polysulfones; poly(styrenes), including styrene-containing copolymers such as acrylonitrilestyrene copolymers, styrene-butadiene copolymers and styrene-vinylbenzylhalide copolymers; polycarbonates; cellulosic polymers, such as cellulose acetate-butyrate, cellulose propionate, ethyl cellulose, methyl cellulose, nitrocellulose, etc.; polyamides and polyimides, including aryl polyamides and aryl polyimides; polyethers; polyetherimides; polyetherketones; polyethersulfones; poly(arylene oxides) such as poly(phenylene oxide) and poly(xylene oxide); poly(esteramide-diisocyanate); polyurethanes; polyesters (including polyarylates), such as polyethylene terephthalate, poly(alkyl methacrylates), poly(acrylates), poly (phenylene terephthalate), etc.; polypyrrolones; polysulfides; polymers from monomers having alpha-olefinic unsaturation other than mentioned above such as poly (ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amides), poly(vinyl amines), poly(vinyl urethanes), poly (vinyl ureas), poly(vinyl phosphates), and poly(vinyl sulfates); polyallyls; poly(benzobenzimidazole); polyhydrazides; poly oxadiazoles; polytriazoles; poly (benzimidazole); polycarbodiimides; polyphosphazines; etc., and interpolymers and the like. In some embodiments, the polymer can be selected from carboxylate substituted polythiophenes. For example, the first polymer binding the SWNTs to a surface of the charge-providing material can be poly[3-(potassium-4-butanoate) thiophene] (PPBT). PPBT has relatively high electronic conductivity of approximately $10^{-5}$ S cm$^{-1}$ when compared with other polymers, and experiences electrochemical doping where the conjugated polymer undergoes reduction within the operating voltage of anode applications, enabling more rapid electron transport. In addition, PPBT, with its conjugated backbone and side chain carboxylic moieties, has been shown to contribute to SWNT dispersion and the formation of carboxylate bonds through interactions with surface electroactive particle OH groups. In particular, the π-conjugated polythiophene backbone physically interacts with the graphene-like electron rich nanotube surface, while the solubilizing carboxylate substituted side chains support SWNT debundling and dispersion in water. In an exemplary embodiment, PPBT can be used to bind the SWNTs to the charge-providing material (such as magnetite) as the first polymer, and CMC and/or PEG can be used to bind the charge-providing material (such as magnetite) to the charge-conducting material (such as graphite) as the second polymer. As would be appreciated by one of ordinary skill in the art, such an embodiment would provide secure binding between the SWNT surface and the active material, and secure binding within the active material between the charge-providing material and the charge-conducting material.

According to some embodiments, the components of the presently disclosed composite electrode can be present in any amount to confer a desirable property to the electrode. In some embodiments, the electrode can present a Coulombic efficiency of 99% or greater (e.g., 99.05% or greater, 99.1% or greater, 99.15% or greater, 99.2% or greater, 99.25% or greater, 99.3% or greater, 99.35% or greater, 99.4% or greater, 99.45% or greater, 99.5% or greater, 99.55% or greater, 99.6% or greater, 99.65% or greater, 99.7% or greater, 99.75% or greater, 99.8% or greater, 99.85% or greater, 99.9% or greater, or 99.95% or greater). In some embodiments, the electrode can present a specific capacity of 500 mAh/g or greater (e.g., 600 mAh/g or greater, 700 mAh/g or greater, 800 mAh/g or greater, 900 mAh/g or greater, 1000 mAh/g or greater, 2000 mAh/g or greater, 3000 mAh/g or greater, or 4000 mAh/g or greater). As would be appreciated by one of ordinary skill in the art, such an embodiment would provide for high capacity electrodes viable for large-scale industrial use, rivaling the performance of currently used electrodes.

As used herein, the term "cycle" or "cycles" shall refer to the period of time for an electrochemical cell to exhaust its potential and recharge to a maximum rechargeable potential. In some embodiments, the electrode can present a stable capacity retention of 75% or greater (e.g., 80% or greater, 85% or greater, 90% or greater, or 95% or greater) after 100 cycles. In some embodiments, the electrode can present a specific capacity change of 5% or less (e.g., 4% or less, 3% or less, 2% or less, or 1% or less) after 200 cycles. In some embodiments, the electrode can undergo a volume change of 40% or less (e.g., 35% or less, 30% or less, 25% or less, 20% or less, 15% or less, 10% or less, 9% or less, 8% or less, 7% or less, 6% or less, 5% or less, 4% or less, 3% or less, 2% or less, or 1% or less) after 100 cycles. As would be appreciated by one or ordinary skill in the art, such an embodiment would provide an electrode with reduced tendency to crack, leading to longer use lifetimes.

Embodiments of the present disclosure can provide a solvent. The solvent compound can be any substance able to substantially dissolve any desired components to create a liquid solution at room temperature and pressure. In some embodiments, the components as disclosed herein can create a uniformly dispersed slurry when added to the solvent. Suitable examples of a solvent can include, but are not limited to, nonpolar solvents, polar aprotic solvents, polar protic solvents, water-miscible solvents, or a combination thereof. There are many examples of appropriate solvents known to one of ordinary skill in the art, but suitable examples can include, but are not limited to, acetaldehyde, acetic acid, acetone, acetonitrile, butanediol, butoxyethanol, butyric acid, diethanolamine, diethylenetriamine, dimethyl acetamide (DMAc), dimethylformamide (DMF), dimethoxy ethane, dimethyl sulfoxide (DMSO), dioxane, ethanol, ethylamine, ethylene glycol, formic acid, furfuryl alcohol, glycerol, methanol, methyl diethanolamine, methyl isocyanide, N-methyl-2-pyrrolidone (NMP), propanol, propanediol, propanoic acid, propylene glycol, pyridine, tetrahydrofuran (THF), triethylene glycol, ethylene glycol, water, dimethyl hydrazine, hydrazine, hydrofluoric acid, hydrogen peroxide, nitric acid, sulfuric acid, pentane, cyclopentane, hexane, cyclohexane, benzene, toluene, chloroform, diethyl ether, dichloromethane, or a combination thereof.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Figure 1:
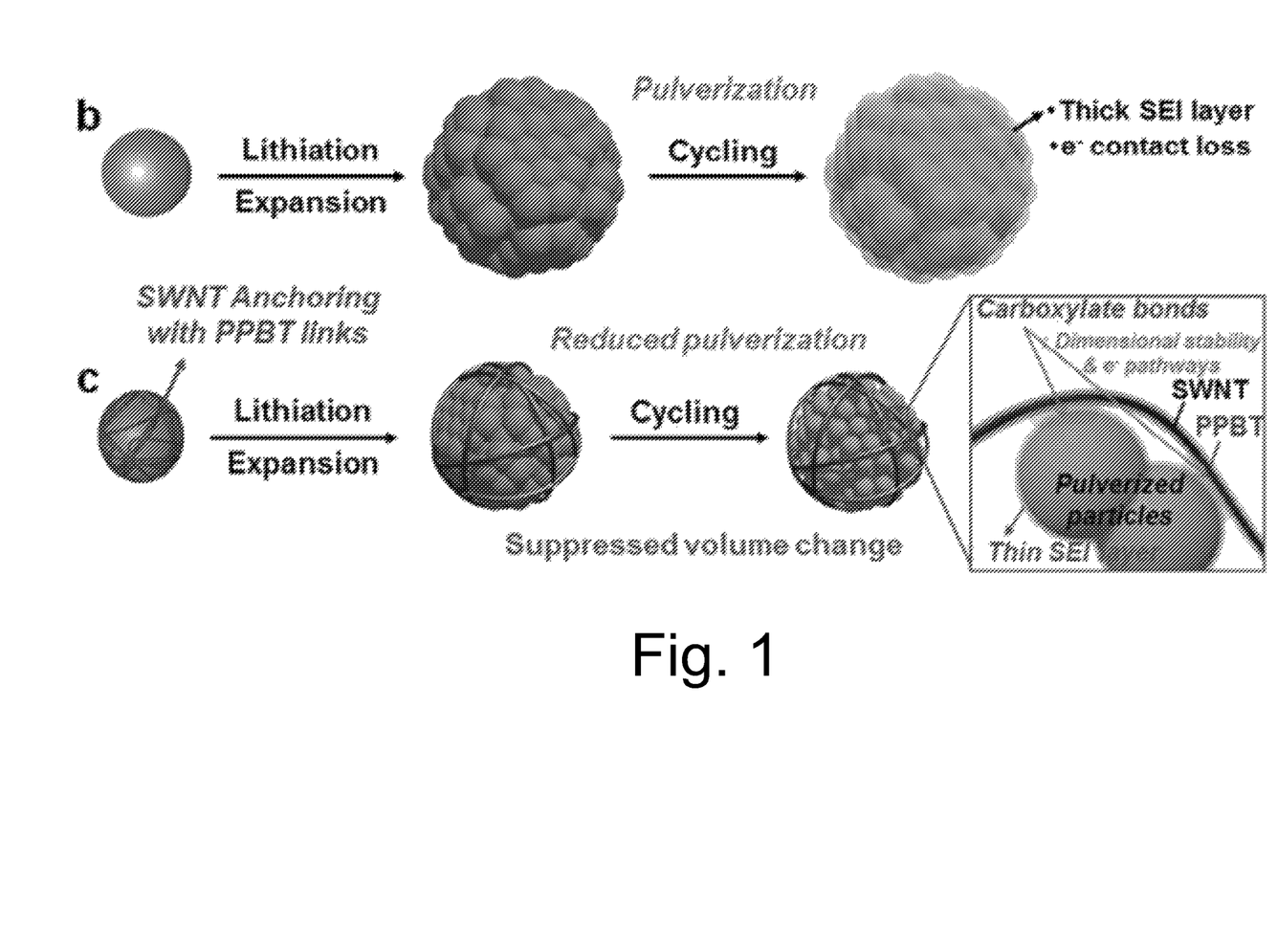
FIG. 1 shows a rendering of an exemplary embodiment of a composite electrode with a rendering of an electrode of the prior art.
Figure 2:
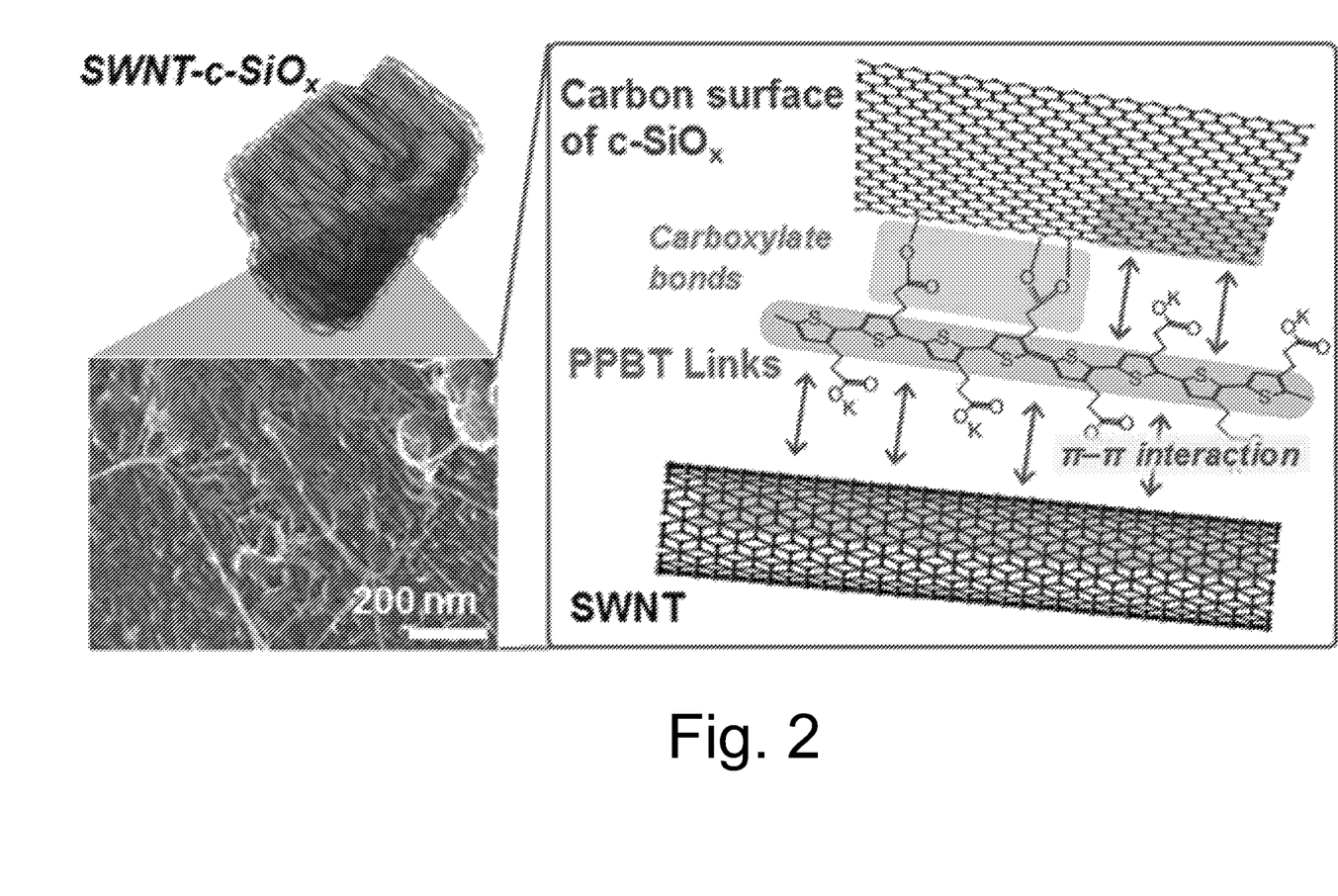
FIG. 2 shows an exploded view rendering of an exemplary embodiment of a composite electrode.
Figure 3A:
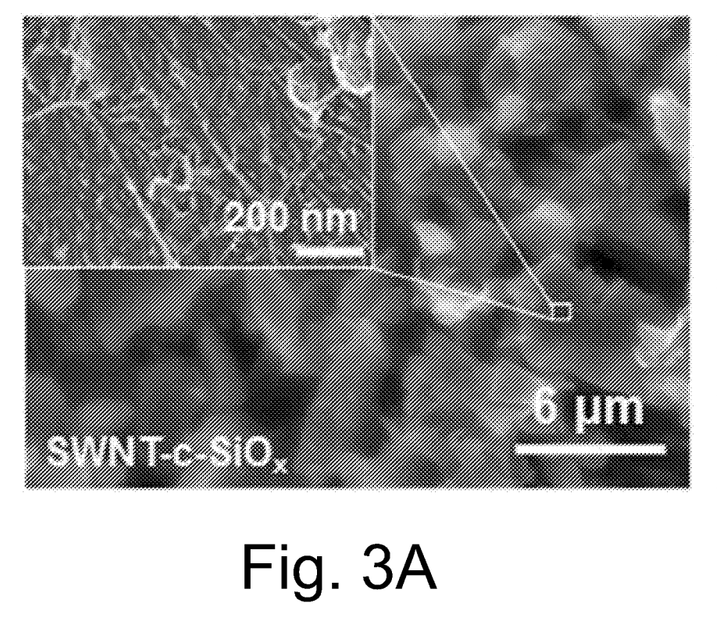
FIGS. 3A-3B show Scanning Electron Microscope (SEM) images of a composite electrode.
Figure 3B:
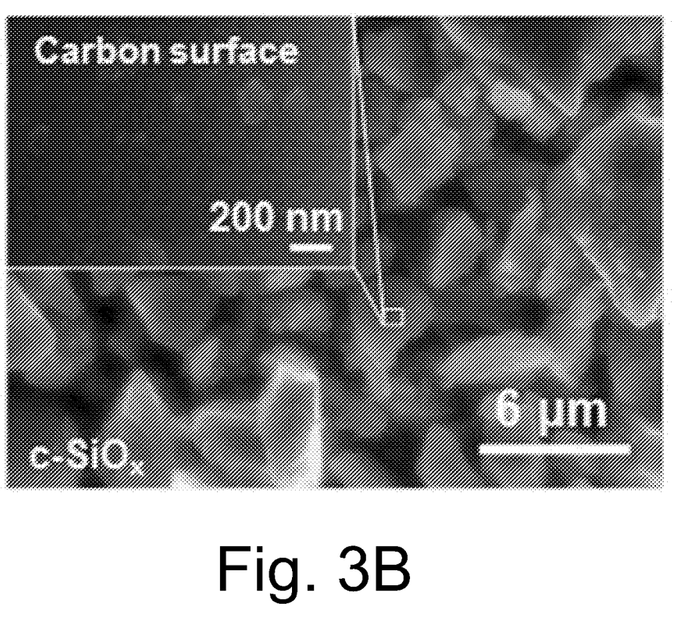
Figure 4:
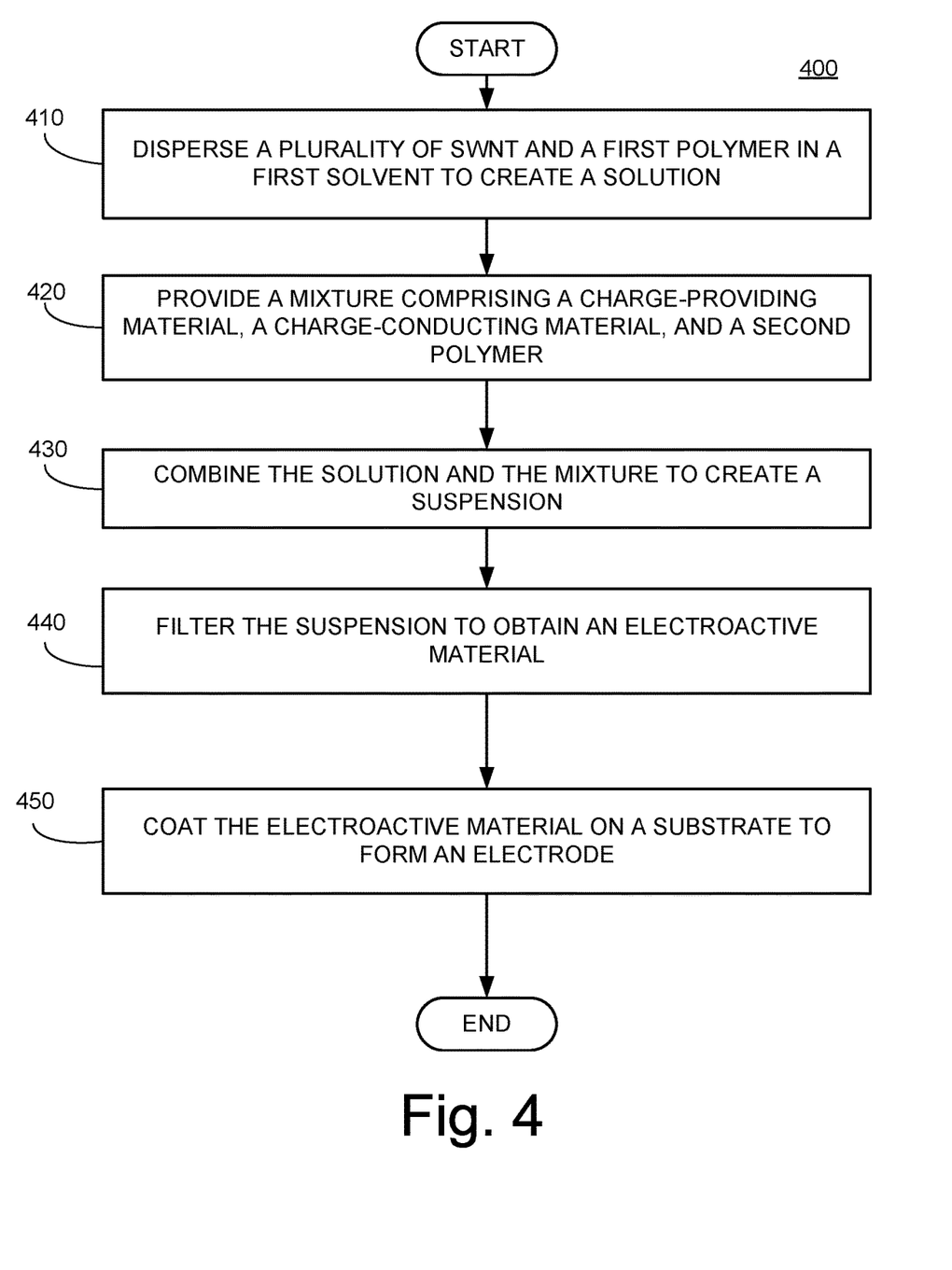
FIG. 4 is a flowchart of an exemplary method for making a composite electrode.
Figure 5:
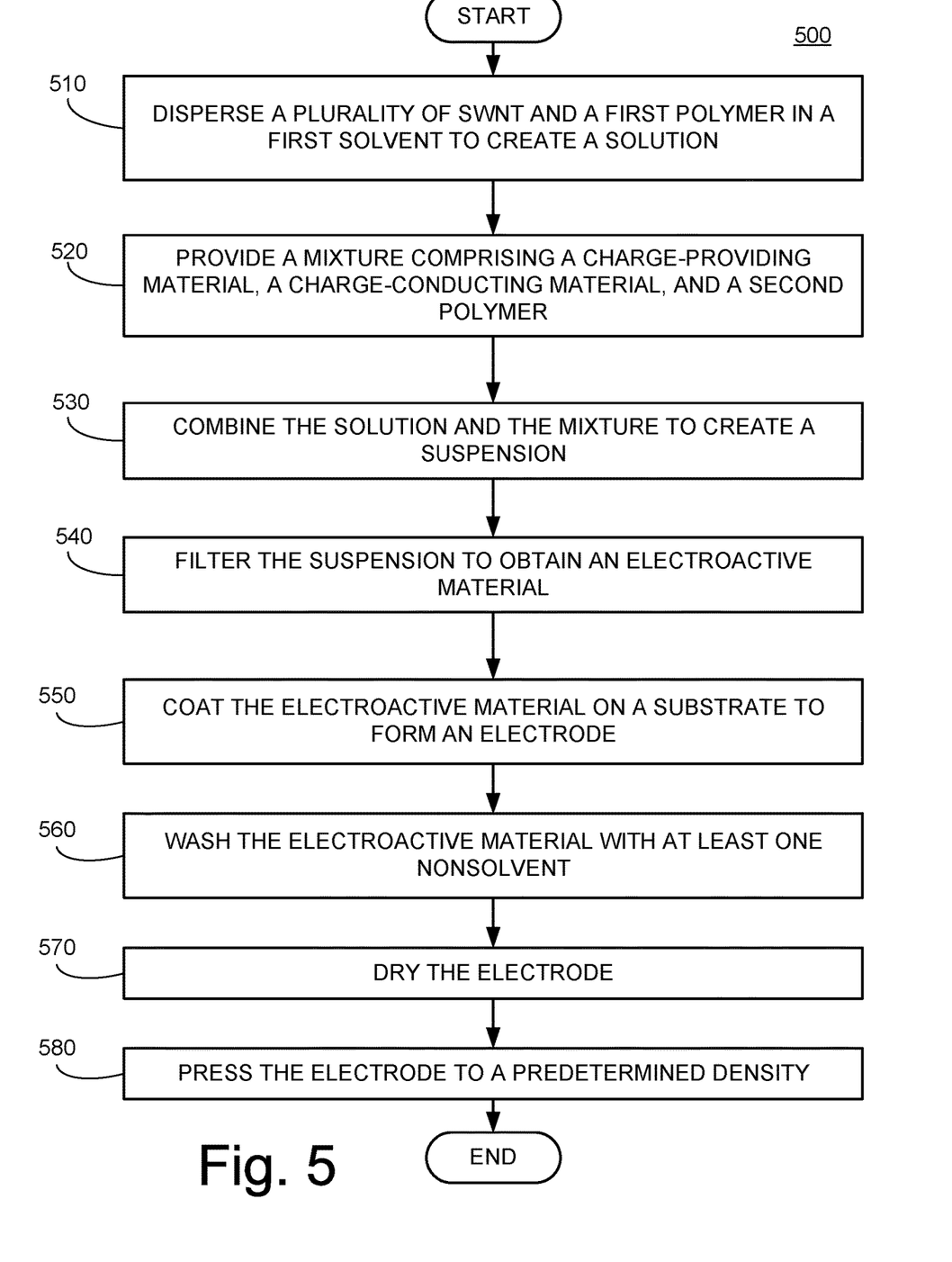
FIG. 5 is a flowchart of an exemplary method for making a composite electrode.
Figure 6:
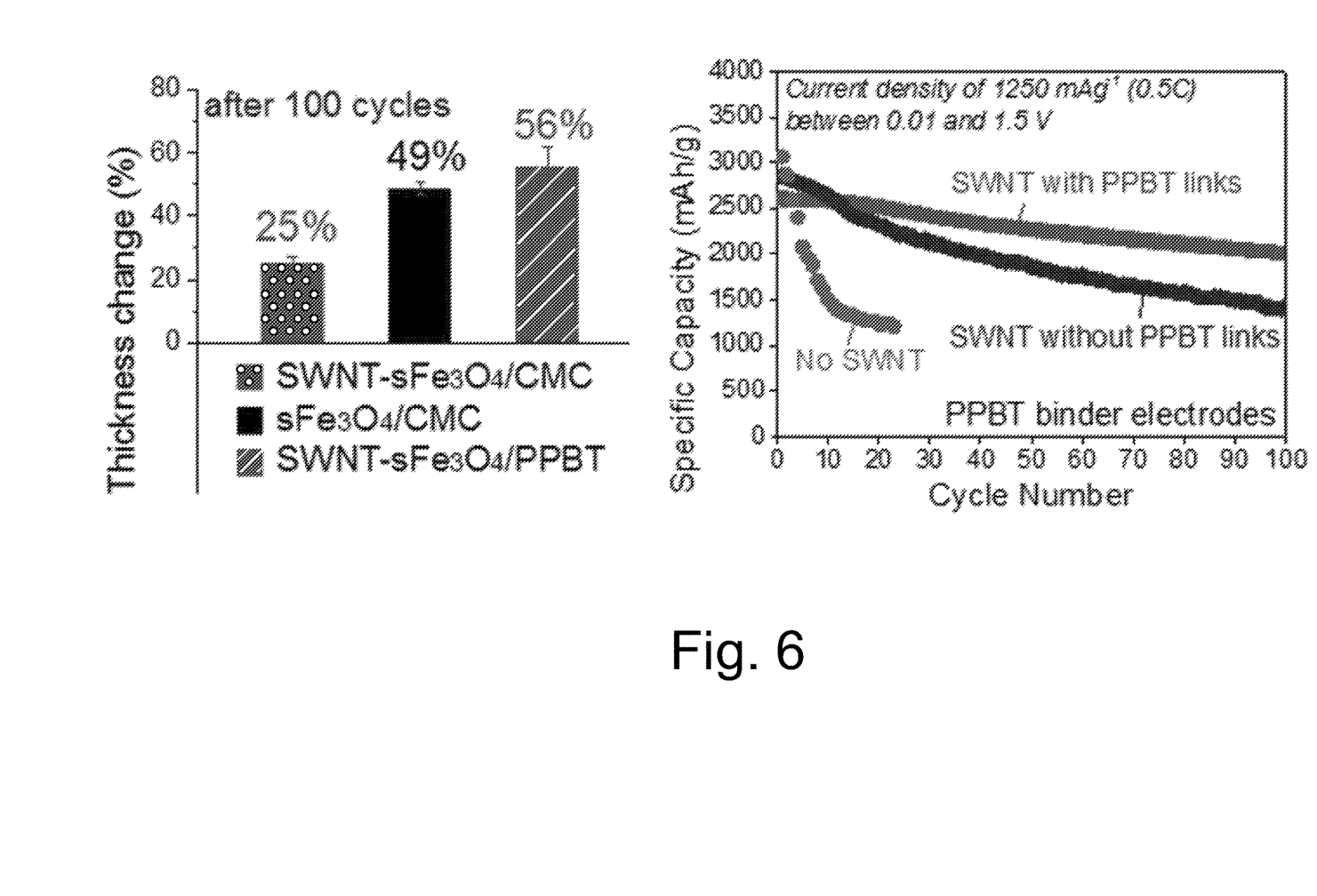
FIG. 6 shows graphs depicting the % volume change and specific capacity change of an exemplary embodiment of a composite electrode.
Figure 7:
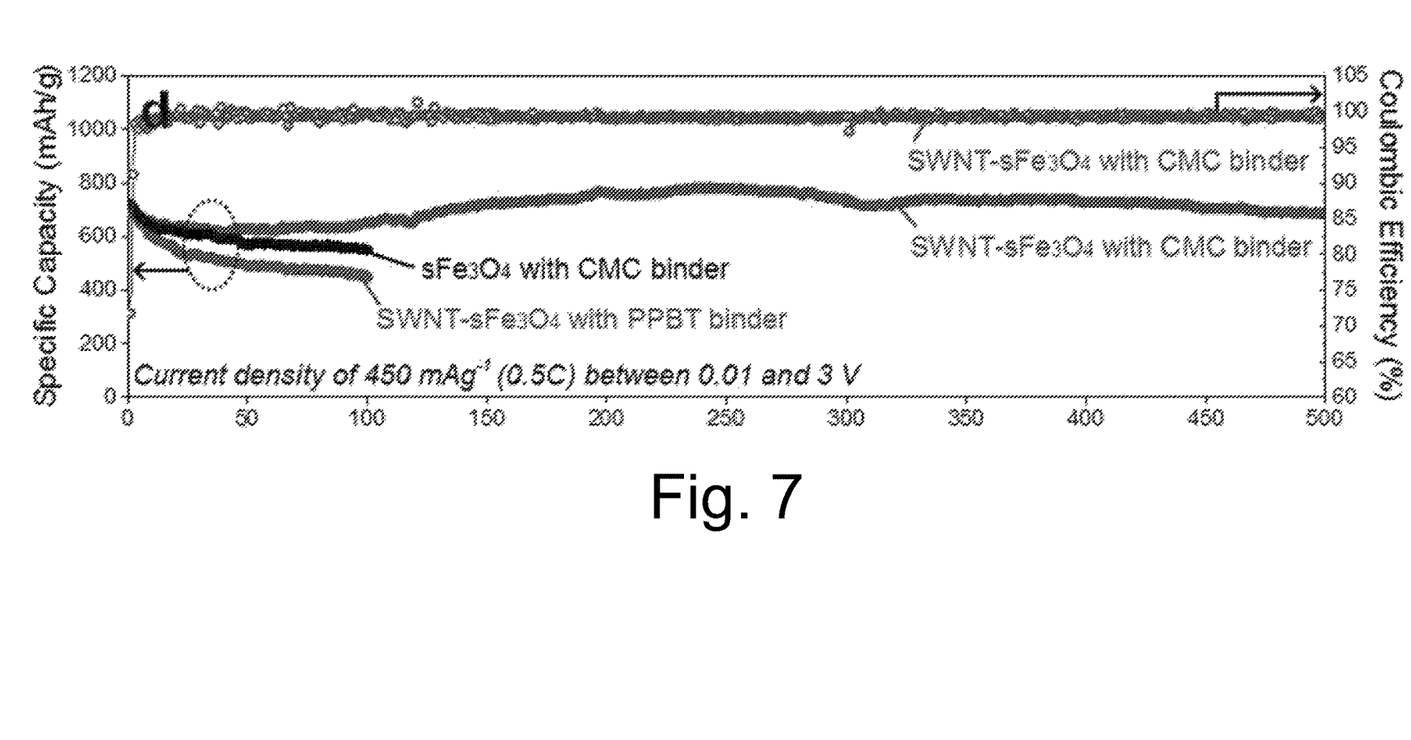
FIG. 7 shows a graph depicting the specific capacity change and Coulombic efficiency of an exemplary embodiment of a composite electrode.

FIGS. 4-5 illustrate exemplary embodiments of the presently disclosed method of making a composite electrode.

In FIG. 4, a method for making a composite electrode is disclosed herein. In block 410, a plurality of single-walled carbon nanotubes (SWNTs) and a first polymer, such as PPBT, can be dispersed in a first solvent to create a solution. In some embodiments, the solution can be mixed using ultrasonication. Other methods of mixing are contemplated, such as agitation, magnetic stir bars, rollers, and the like. It is understood that, in some embodiments, the solution can comprise other species, such as inhibitors, catalysts, non-solvents, and the like.

In block 420, a mixture can be provided comprising a charge-providing material, a charge-conducting material, and a second polymer. In some embodiments, the mixture can comprise other species, such as inhibitors, catalysts, nonsolvents, and the like. In some embodiments, the mixture can be in a solution with a second solvent. In some embodiments, the mixture can be removed from the second solvent by way of a density separation. Suitable examples of a density separation can include centrifugation, float tanks, cyclones, and the like.

In block 430, the solution and the mixture can be combined to create a suspension. In some embodiments, the suspension can be mixed using ultrasonication. Other methods of mixing are contemplated, such as agitation, magnetic stir bars, rollers, and the like. It is understood that, in some embodiments, the suspension can comprise other species, such as inhibitors, catalysts, nonsolvents, and the like.

In block 440, the suspension can be filtered to obtain a solid electroactive material. In some embodiments, the filtering can comprise vacuum filtering. Suitable examples of a filter can include a screen, a mesh, a sieve, and the like. Other methods of filtration are considered, such as reverse osmosis, bag filters, paper filters, and the like.

In block 450, the solid electroactive material can be coated onto a substrate to form an electrode. In some embodiments, the substrate can be any solid material able to support the electroactive material. Suitable examples of a substrate can include, but are not limited to, copper mesh, copper foil, aluminum foil, and the like.

In FIG. 5, a method for making a composite electrode is disclosed herein. Blocks 510 to 550 remain substantially analogous to the exemplary disclosure of FIG. 4, with all the considerations and embodiments therein.

In block 560, the electroactive material coated on the substrate can be washed with a nonsolvent. The nonsolvent can be any material substantially unable to dissolve the electroactive material, such as water, ethanol, or acetone. Additionally, the washing of the electroactive material can be performed prior to the coating of the substrate with the electroactive material.

In block 570, the electrode can be dried. In some examples, the electrode can be dried in a fume hood, oven, convection oven, vacuum oven, or the like.

In block 580, the electrode can be pressed to present a predetermined density. Suitable examples of pressing can include, but are not limited to, hydraulic press, gravity press, weighted press, compression molding, and the like.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

EXAMPLES

The following examples are provided by way of illustration but not by way of limitation.

Example 1

Materials and Methods

Monodispersed spherical $Fe_3O_4$ particles (~500 nm in diameter) were synthesized by a solvothermal method reported by Fan et al.[1] The precursor solution was prepared by $FeCl_3 \cdot 6H_2O$ (2.16 g) and $CH_3COONa \cdot 3H_2O$ (5.76 g) dissolved in 40 mL of ethylene glycol (EG) to form homogeneous solution with stirring for 24 h, and then sealed in a Teflon lined stainless autoclave (45 mL capacity), in which the concentration of $FeCl_3 \cdot 6H_2O$ was 0.200 mol $L^{-1}$. The autoclave was heated to 200° C. for 8 h, and then cooled to room temperature. After sequentially washing several times with deionized water and ethanol using a centrifuge, monodispersed $Fe_3O_4$ spheres ($sFe_3O_4$) were produced. As synthesized $sFe_3O_4$ particles, composed of small $Fe_3O_4$ crystallites (~71 nm), have an average size of 498 nm.[2] For the preparation of $sFe_3O_4$ particles coated with PEG (PEG-$sFe_3O_4$), 1 g of $sFe_3O_4$ powders in 10 g ethanol adding 8 mL of PEG 1500 solution (50% w/v, Sigma-Aldrich) were sonicated for 30 min in the ice bath with an ultrasonic probe. The PEG-$sFe_3O_4$ powders were washed and extracted by centrifuge separation using acetone with speed of 6000 rpm for 10 min for 3 times. PPBT ($M_w$: 16 kDa, polydispersity: 2.2, the head to tail regioregularity: 89%) was purchased from Rieke Metals Inc. For the preparation of SWNT-$sFe_3O_4$, the mixture of SWNT (10 mg, Sigma-Aldrich) in PPBT solution (20 mg of PPBT, 4 mL of deionized water) was sonicated for 15 min in the ice bath with an ultrasonic probe. After adding PEG-$sFe_3O_4$ (100 mg) into the SWNT dispersion, the mixture suspension was subjected to further ultrasonication for 3 min. The resultant SWNT/PEG-$sFe_3O_4$ suspension was vacuum-filtrated onto a membrane filter (PVDF membrane filter with pore size of 0.22 μm, EMD millipore) adding sufficient water, ethanol and acetone for washing. As-filtered powders was finally vacuum-dried at 110° C. for overnight, eventually producing SWNT-$sFe_3O_4$ electroactive particles. The SWNT-$sFe_3O_4$ particles assisted by SDBS surfactant (no PPBT linkage sample) were prepared by the same process mentioned above, except for the SWNT suspension preparation using SDBS surfactant solution (concentration=1.0 wt % in water) instead of PPBT solution. In case of Si NPs (50-70 nm, US Research Nanomaterials, Inc.), material preparation for SWNT anchoring with PPBT links followed the same procedure with SWNT-$sFe_3O_4$ preparation. Terephthalic acid (≥98% purity) and 2-aminoterephthalic acid (≥99+% purity) were purchased from Sigma Aldrich and used with no further purification to create MIL-53(Al) and MIL-53-NH$_2$(Al) samples, respectively. Trimesic acid (95% purity) from Sigma Aldrich was used without further purification.

Working electrodes were made by blade-coating electrode slurry on the Cu foil substrate with active material (sFe$_3$O$_4$, SWNT-sFe$_3$O$_4$, Si NPs, SWNT-Si NPs), carbon black (CB) and binder (PPBT, sodium carboxymethyl cellulose (CMC)). The electrode comprising SWNT-sFe$_3$O$_4$ (or sFe$_3$O$_4$), CB, and binder (CMC or PPBT) was 71.4:14.3:14.3 in a mass ratio,[3] whereas 52:34:14 for the electrode consisting of active material (Si NPs, SWNT-Si NPs), CB, and binder (CMC or PPBT). Deionized water was used as a solvent. The sFe$_3$O$_4$ and Si NPs mass loading in the present study was typically 1.9-3.0 mg cm$^{-2}$ and 0.8-1.9 mg cm$^{-2}$, respectively. These prepared electrodes were pre-evaporated at 65° C. for 3 h and completely evaporated at 110° C. for 12 h in a vacuum oven, and then pressed until the density of the electrode became ~0.7-0.9 g cm$^{-3}$.

2032-type coin cells (MTI corp.) were used for electrochemical measurements. Lithium metal was used as a counter electrode and 1.2 M LiPF$_6$ in ethylene carbonate (EC) and diethyl carbonate (DEC) (1:1 by volume) with 10 wt % fluoroethylene carbonate (FEC) for long cycle stability, was utilized as an electrolyte. When testing coin cells comprising sF$_3$O$_4$-based electrodes, only constant current (CC) condition was used (i.e. lithiated to 0.01 V and delithiated to 3.0 V at the set value of current density), whereas when measuring coin cells comprising Si NPs-based electrodes, a constant current (CC) constant voltage (CV) technique was applied: the coin cell was lithiated to 0.01 V at the set value of current density under constant current (CC) condition and then maintained at constant voltage (CV) of 0.01 V until the current density became 0.05 C. In turn, the cell was delithiated to 1.5 V at the set value of current density under CC condition. Before electrochemical testing, all the coin cells were charging and discharging with the current density of 0.1 C to confirm their capacity and initial efficiency. The tests were then proceeded for cycling performance and rate capability.

Example 2

Materials and Methods

Prior to the integration with SWNTs using a PPBT component, PEG coating on the c-SiO$_x$ (KSC1064, Shin-Etsu Chemical Co., Ltd.) surface was required. For the preparation of c-SiO$_x$ particles coated with PEG (PEG-c-SiO$_x$), 1 g of c-SiO$_x$ powders in 10 g ethanol and 8 mL of PEG 1500 solution (50% w/v, Sigma-Aldrich) were sonicated for 15 min in the ice bath with an ultrasonic probe. The PEG-c-SiO$_x$ powders were washed and extracted by centrifuge separation using acetone with speed of 6000 rpm for 10 min for 3 times. For the preparation of SWNT-c-SiO$_x$, the mixture of SWNT (10 mg, Sigma-Aldrich) in PPBT solution (20 mg of PPBT, 4 mL of deionized water) was sonicated for 15 min in the ice bath with an ultrasonic probe. PPBT (M$_w$: 16 kDa, polydispersity: 2.2, the head to tail regioregularity: 89%) was purchased from Rieke Metals Inc. After adding as-prepared PEG-c-SiO$_x$ (100 mg) into the SWNT-dispersed PPBT solution, the mixture suspension was subjected to further ultrasonication for 3 min. The resultant SWNT/PEG-c-SiO$_x$ suspension was vacuum-filtrated onto a membrane filter (PVDF membrane filter with pore size of 0.22 μm, EMD Millipore) adding sufficient water, ethanol and acetone for washing. As-filtrated powders was finally vacuum-dried at 110° C. for overnight, finally preparing SWNT-c-SiO$_x$ electroactive particles. The SWNT-c-SiO$_x$ particles assisted by SDBS surfactant (no PPBT linkage sample) were prepared by the same process mentioned above, except for the SWNT suspension preparation using SDBS surfactant solution (concentration=1.0 wt % in water) instead of PPBT solution.

Working electrodes were made by blade-coating electrode slurry on the Cu foil substrate with active material (c-SiO$_x$, SWNT-c-SiO$_x$, c-SiOx/graphite blend, SWNT-c-SiO$_x$/graphite blend), carbon black (CB) and binder (PPBT, sodium carboxymethyl cellulose (CMC), CMC/styrene butadiene rubber (SBR)). The electrode comprising SWNT-c-SiO$_x$ (or c-SiO$_x$), CB, and binder (CMC or PPBT) was 52:34:14 in a mass ratio. Similarly, in the graphite-blended systems with PPBT or CMC binder, the mass ratio of SWNT-c-SiO$_x$/graphite blend, CB, and binder was 52:34:14. When fabricating CMC/SBR binder-based electrodes, active material (c-SiO$_x$/graphite blend, or SWNT-c-SiO$_x$/graphite blend), CB, CMC, and SBR were 95.8:1.7:1.5:1 in a mass ratio. In the graphite-blended system, the active material was prepared by blending SWNT-c-SiO$_x$ with graphite in a mass ratio of 30:70. These prepared electrodes were pre-evaporated at 65° C. for 3 h and completely evaporated at 110° C. for 12 h in a vacuum oven, and then pressed until the density of the electrode became ~0.7-0.9 g cm$^{-3}$.

2032-type coin cells (MTI corp.) were used for electrochemical measurements. Lithium metal was used as a counter electrode and 1.2 M LiPF$_6$ in ethylene carbonate (EC) and diethyl carbonate (DEC) (1:1 by volume) with 10 wt % fluoroethylene carbonate (FEC) for long cycle stability, was utilized as an electrolyte. When testing coin cells, a constant current (CC) constant voltage (CV) technique was applied: the coin cell was lithiated to 0.01 V at the set value of current density under CC condition and then maintained at CV of 0.01 V until the current density became 0.05 C. In turn, the cell was delithiated to 1.5 V at the set value of current density under CC condition. Before electrochemical testing, all the coin cells were charging and discharging with the current density of 0.1 C to confirm their capacity and initial efficiency. The tests were then proceeded for cycling performance and rate capability.

Example 3

Methods

A prototype full cell sealed with an aluminumized polymer pouch was fabricated with a negative/positive (n/p) ratio of 1.08; the anode and cathode areal capacities were 3.15 mAh cm$^{-2}$ and 2.93 mAh cm$^{-2}$. The cathode was prepared by blade-coating electrode slurry on an aluminum (Al) foil substrate with a commercialized lithium cobalt oxide (LiCoO$_2$, or LCO), CB, and polyvinylidene fluoride (PVDF) binder in a mass ratio of 94:3:3 using N-methyl-2-pyrrolidone (NMP) as the solvent and dried at 110° C. for 1 h, and then pressed until the density of the electrode became ~3.8 g cm$^{-3}$. The Al pouch-type full cells, composed of a porous polyethylene (PE) separator sandwiched between anode and cathode, were assembled. The electrolyte comprising 1.2 M LiPF$_6$ in EC/DEC (1:1 by volume) with 10 wt % FEC was injected and the pouch was completely sealed. The pouch-type cells were fabricated in a globe box filled with argon gas. The prepared full cells were precycled in the first three cycles over the potential range of 2.5-4.25 V at 0.05 C under CC/CV mode for charging to 4.25 V and maintained 4.25 V until the current density became 0.03 C, and then CC mode for discharging to 2.5 V. The tests were then proceeded for cycling performance and rate capability.

Example 4

Characterization Methods

The field-emission scanning electron microscopy (FE-SEM) images were observed on the surface view of the electrodes using Zeiss Ultra-60 FE-SEM (or Hitachi SU-8230 FE-SEM) with an accelerating voltage of 5-10 kV using the high vacuum mode at room temperature.

While the present disclosure has been described in connection with a plurality of exemplary aspects, as illustrated in the various figures and discussed above, it is understood that other similar aspects can be used or modifications and additions can be made to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. Instead, it is intended that the invention is defined by the claims appended hereto.

What is claimed is:

1. A composite electrode comprising:
a charge-providing material comprising magnetite; and
single-walled carbon nanotubes bound to a surface of the charge-providing material.

2. The composite electrode of claim 1 further comprising a charge-conducting material;
wherein the charge-providing material is bound to the charge-conducting material.

3. A composite electrode comprising:
a charge-providing material;
single-walled carbon nanotubes bound to a surface of the charge-providing material; and
a conjugated polymer possessing polar functionality to effectively anchor the single-walled carbon nanotubes to the surface of the charge-providing material;
wherein the conjugated polymer comprises poly[3-(potassium-4-butanoate) thiophene] (PPBT); and
wherein the charge-providing material comprises a material selected from the group consisting of monodispersed $Fe_3O_4$ spheres, silicon nanoparticles, metallic oxide, magnetite, and a combination thereof.

4. The composite electrode of claim 2 further comprising:
a first polymer binding the single-walled carbon nanotubes to the charge-providing material; and
a second polymer binding the charge-providing material to the charge-conducting material.

5. The composite electrode of claim 4, wherein the first polymer comprises a polymer with carboxylic acid side chains.

6. The composite electrode of claim 4, wherein the first polymer is bound to the single-walled carbon nanotube layer through pi bond-pi bond stacking.

7. A composite electrode comprising:
a charge-providing material;
single-walled carbon nanotubes bound to a surface of the charge-providing material; and
a polymer binding the single-walled carbon nanotubes to the charge-providing material;
wherein the polymer is poly[3-(potassium-4-butanoate) thiophene] (PPBT).

8. A composite electrode comprising:
a charge-providing material bound by a first polymer to a charge-conducting material; and
single-walled carbon nanotubes bound by a second polymer to a surface of the charge-providing material;
wherein the charge-providing material comprises silicon nanoparticles; and
wherein the first polymer is carboxymethyl cellulose (CMC).

9. A composite electrode comprising:
a charge-providing material; and
single-walled carbon nanotubes bound to a surface of the charge-providing material;
wherein the composite electrode presents a Coulombic efficiency of 99% or greater; and
wherein:
the charge-providing material comprises magnetite;
the charge-providing material is bound by a first polymer to a charge-conducting material, the single-walled carbon nanotubes are bound to the surface of the charge-providing material by a second polymer, the charge-providing material comprises silicon nanoparticles, and the first polymer is carboxymethyl cellulose (CMC); or
the charge-providing material is bound by a first polymer to a charge-conducting material, the single-walled carbon nanotubes are bound to the surface of the charge-providing material by a second polymer, the charge-providing material comprises magnetite and silicon nanoparticles, and the first polymer is carboxymethyl cellulose (CMC).

10. The composite electrode of claim 9, wherein the electrode presents a Coulombic efficiency of from 99.5% to 99.95%.

11. A composite electrode comprising:
a charge-providing material; and
single-walled carbon nanotubes bound to a surface of the charge-providing material;

wherein the composite electrode presents a Specific Capacity of 500 mAh/g or greater; and wherein:
- the charge-providing material comprises magnetite;
- the charge-providing material is bound by a first polymer to a charge-conducting material, the single-walled carbon nanotubes are bound to the surface of the charge-providing material by a second polymer, the charge-providing material comprises silicon nanoparticles, and the first polymer is carboxymethyl cellulose (CMC); or
- the charge-providing material is bound by a first polymer to a charge-conducting material, the single-walled carbon nanotubes are bound to the surface of the charge-providing material by a second polymer, the charge-providing material comprises magnetite and silicon nanoparticles, and the first polymer is carboxymethyl cellulose (CMC).

12. A composite electrode comprising:

a charge-providing material; and single-walled carbon nanotubes bound to a surface of the charge-providing material;

wherein the composite electrode presents a stable capacity retention of 75% or greater after 100 cycles; and wherein:
- the charge-providing material comprises magnetite;
- the charge-providing material is bound by a first polymer to a charge-conducting material, the single-walled carbon nanotubes are bound to the surface of the charge-providing material by a second polymer, the charge-providing material comprises silicon nanoparticles, and the first polymer is carboxymethyl cellulose (CMC); or
- the charge-providing material is bound by a first polymer to a charge-conducting material, the single-walled carbon nanotubes are bound to the surface of the charge-providing material by a second polymer, the charge-providing material comprises magnetite and silicon nanoparticles, and the first polymer is carboxymethyl cellulose (CMC).

13. A composite electrode comprising:

a charge-providing material; and single-walled carbon nanotubes bound to a surface of the charge-providing material;

wherein the composite electrode initial Specific Capacity changes by 5% or less after 200 cycles or more; and wherein:
- the charge-providing material comprises magnetite;
- the charge-providing material is bound by a first polymer to a charge-conducting material, the single-walled carbon nanotubes are bound to the surface of the charge-providing material by a second polymer, the charge-providing material comprises silicon nanoparticles, and the first polymer is carboxymethyl cellulose (CMC); or
- the charge-providing material is bound by a first polymer to a charge-conducting material, the single-walled carbon nanotubes are bound to the surface of the charge-providing material by a second polymer, the charge-providing material comprises magnetite and silicon nanoparticles, and the first polymer is carboxymethyl cellulose (CMC).

14. A composite electrode comprising:

a charge-providing material; and single-walled carbon nanotubes bound to a surface of the charge-providing material;

wherein the composite electrode undergoes a volume change of 40% or less after 100 cycles; and wherein:
- the charge-providing material comprises magnetite;
- the charge-providing material is bound by a first polymer to a charge-conducting material, the single-walled carbon nanotubes are bound to the surface of the charge-providing material by a second polymer, the charge-providing material comprises silicon nanoparticles, and the first polymer is carboxymethyl cellulose (CMC); or
- the charge-providing material is bound by a first polymer to a charge-conducting material, the single-walled carbon nanotubes are bound to the surface of the charge-providing material by a second polymer, the charge-providing material comprises magnetite and silicon nanoparticles, and the first polymer is carboxymethyl cellulose (CMC).

15. In a composite electrode comprising:

a charge-providing material; and single-walled carbon nanotubes;

wherein the improvement to the composite electrode is selected from the group consisting of:
- the charge-providing material comprises magnetite;
- the charge-providing material is bound by a first polymer to a charge-conducting material, the single-walled carbon nanotubes are bound to a surface of the charge-providing material by a second polymer, the charge-providing material comprises silicon nanoparticles, and the first polymer is carboxymethyl cellulose (CMC);
- the charge-providing material is bound by a first polymer to a charge-conducting material, the single-walled carbon nanotubes are bound to a surface of the charge-providing material by poly[3-(potassium-4-butanoate) thiophene] (PPBT), and the charge-providing material comprises silicon nanoparticles; and
- a combination thereof.

16. The composite electrode of claim 7, wherein the charge-providing material comprises a metallic oxide.

17. The composite electrode of claim 16, wherein the charge-providing material comprises magnetite.

* * * * *